Jan. 3, 1956
V. O. HAUSWIRTH ET AL
2,729,468
SIDE DRAFT IMPLEMENT HITCH FRAME
WITH LONGITUDINAL PIVOTAL AXIS
Filed Sept. 18, 1952
3 Sheets-Sheet 1
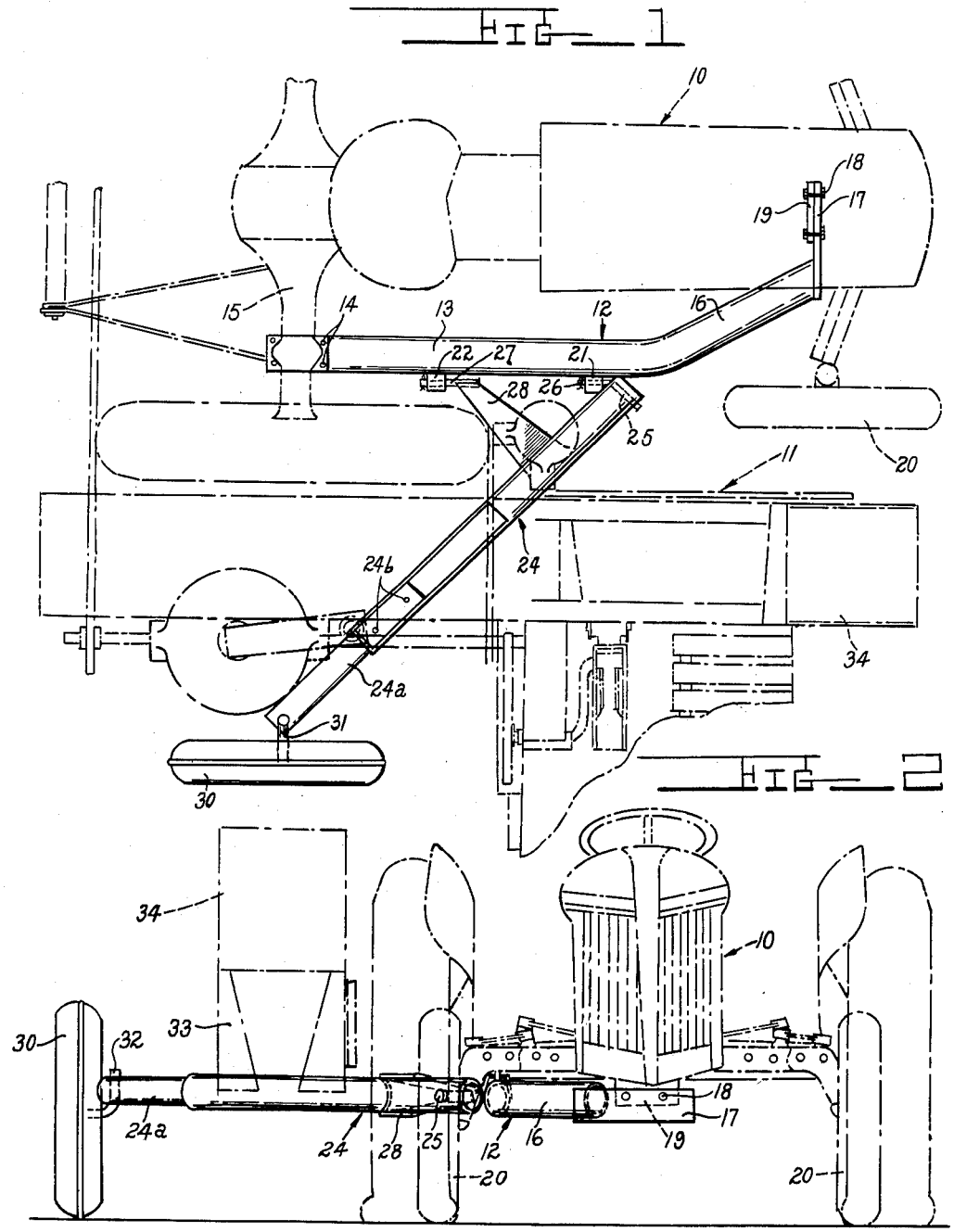
INVENTORS
VERNON O. HAUSWIRTH
& CHARLES E. McKEON
BY
AND
ATTORNEYS

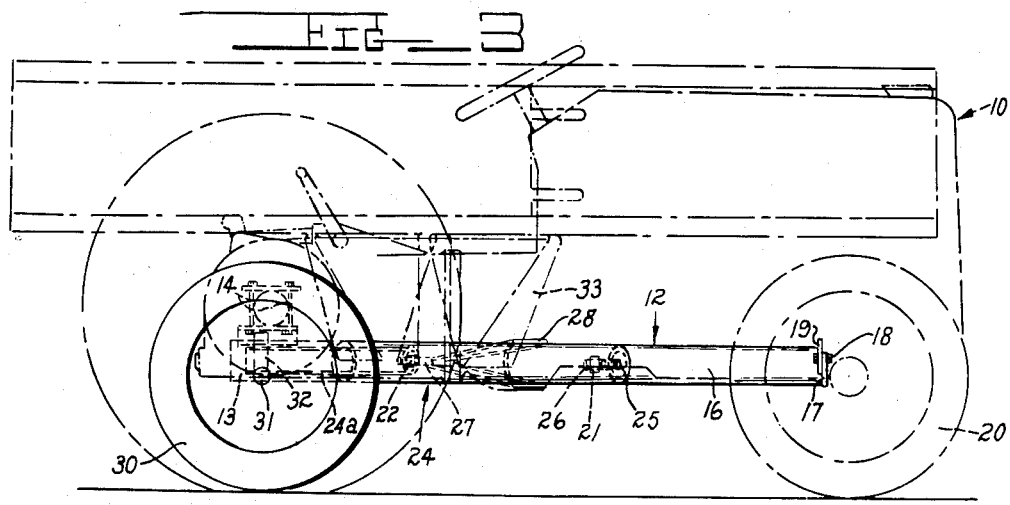
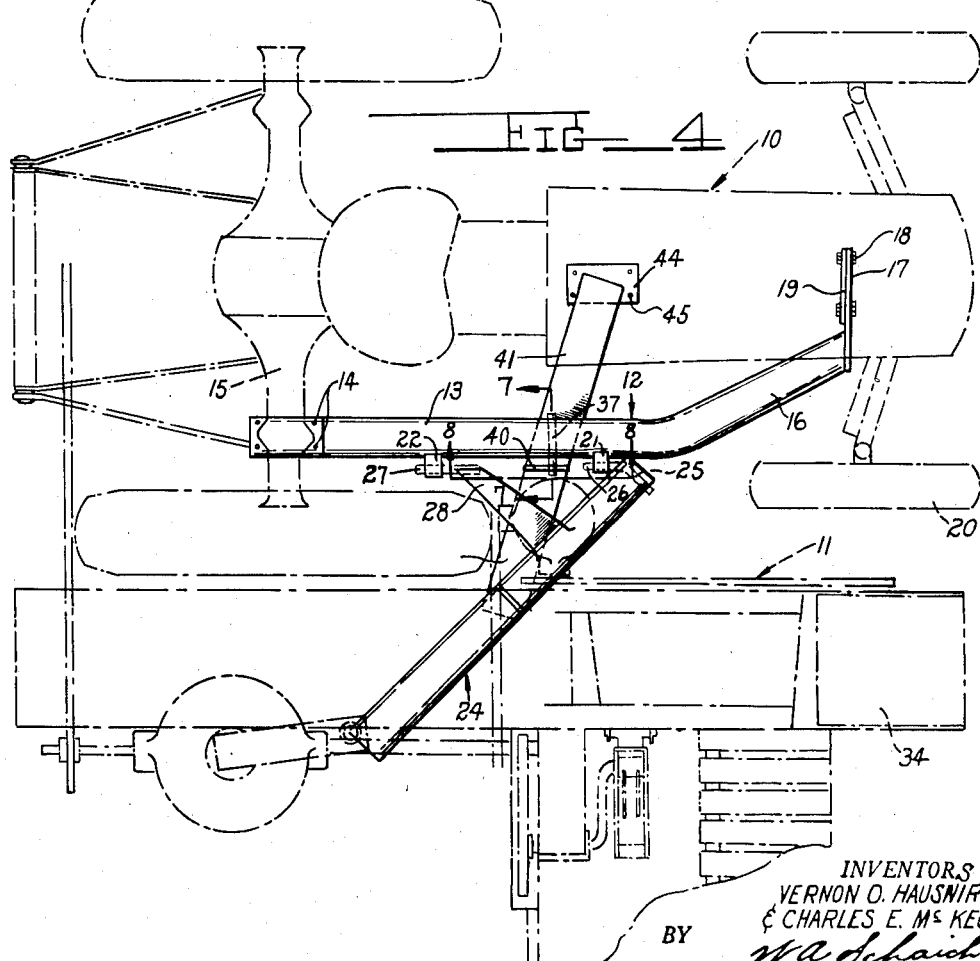

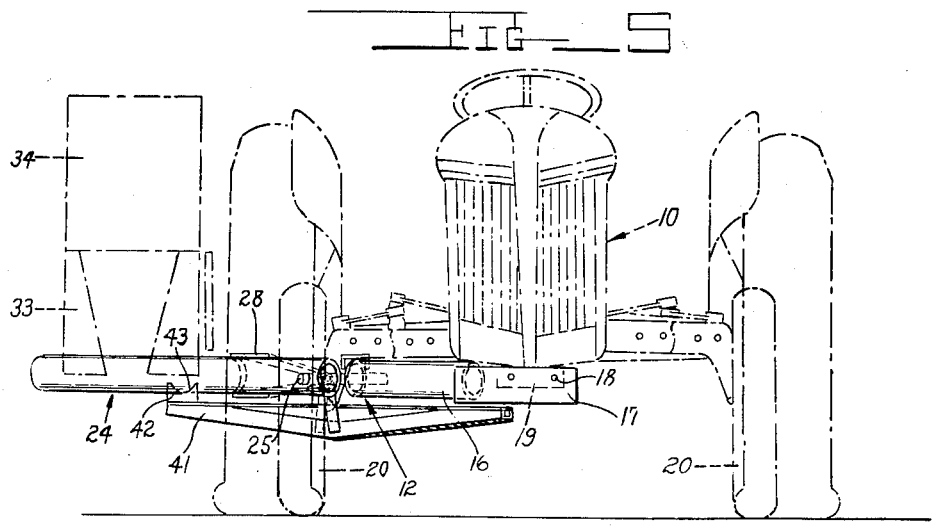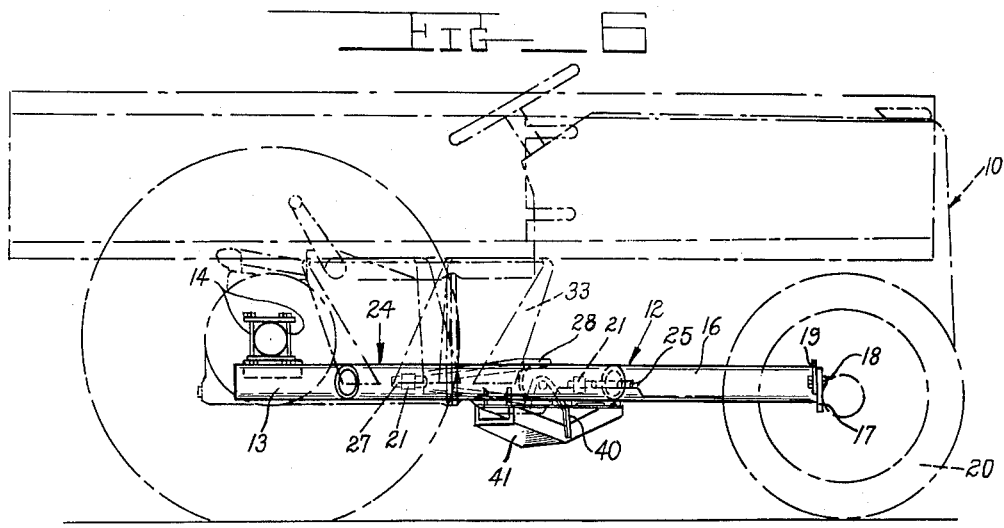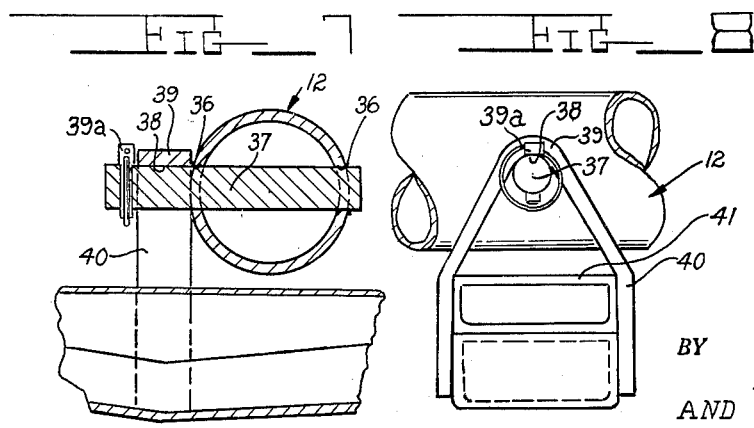

United States Patent Office 2,729,468
Patented Jan. 3, 1956

2,729,468

SIDE DRAFT IMPLEMENT HITCH FRAME WITH LONGITUDINAL PIVOTAL AXIS

Vernon O. Hauswirth, Royal Oak, and Charles E. McKeon, Birmingham, Mich., assignors, by mesne assignments, to Ford Motor Company, Dearborn, Mich., a corporation of Delaware Application September 18, 1952, Serial No. 310,282

4 Claims. (Cl. 280—456)

The present invention relates to an implement frame for tractors and more particularly, to an implement frame for the attachment of an implement to a tractor with at least a portion of the weight of the implement being imposed upon the tractor.

The present invention is particularly concerned with the mounting of a relatively heavy implement, such as a harvesting machine or the like, in laterally aligned relation to a prime mover, preferably a farm tractor. The implement is secured to the tractor or prime mover in lateral alignment, so that the prime mover and implement form an integrated unit preferably powered by the prime mover and steerable by manipulation of the prime mover steering gear.

More specifically, the implement frame herein disclosed includes a primary or main frame rigidly carried by the tractor to extend longitudinally thereof and a second frame pivotally connected to the primary frame for movement in a vertical plane and projecting laterally beyond the prime mover. The secondary frame is adapted to carry the implement in laterally spaced relation to the tractor and the pivotal tractor-implement connection is effective to cause concurrent longitudinal movement of the tractor and the implement along the tractor path of travel.

The frame arrangement may be utilized for the semimounting of an implement upon the tractor by providing a ground-engaging wheel at the outboard end of the secondary frame, so that the weight of the implement is divided between the ground-engaging implement wheel and the tractor. Alternatively, a stabilizer element may be connected between the primary and secondary frames to prevent free-vertical movement of the frames relative to one another, so that all of the weight of the implement is imposed upon the tractor and a fully mounted tractor-implement mounting is provided.

It is, therefore, an important object of the present invention to provide an improved implement mounting frame adapted for attaching an implement to a tractor by a pair of normally relatively movable frame beams on the implement and the tractor, respectively, together with means for resisting relative movement of the beams.

Another important object is the provision of means for disposing an implement upon a tractor so that a predetermined portion of the weight of the implement is borne by the tractor.

It is a further important object of the present invention to provide an implement mounting frame including a fixed tractor-mounted frame and a secondary frame pivotally connected to the main frame for carrying an implement and ground-engaging means mounted on the secondary frame for bearing a portion of the weight of the implement.

Yet another important object is the provision of an implement mounting means for a tractor including a tractor-mounted main frame, a secondary frame pivotally connected to the main frame for supporting an implement, and a stabilizer element interconnecting the secondary frame and the tractor to prevent relative movement between the frames so that the entire weight of the implement is borne by the frame.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Figure 1 is a plan view of an implement frame of the present invention for connecting a tractor and an implement, as shown in dotted outline, in semi-mounted relationship;

Figure 2 is a front elevational view of the frame of Figure 1;

Figure 3 is a side elevational view of the frame of Figures 1 and 2;

Figure 4 is a plan view similar to Figure 1 illustrating a modified form of frame for fully mounting an implement upon the tractor;

Figure 5 is a front elevational view of the frame of Figure 4;

Figure 6 is a side elevational view of the frame of Figures 4 and 5;

Figure 7 is a greatly enlarged sectional view taken along the plane 7—7 of Figure 4; and Figure 8 is an enlarged sectional view, with parts shown in elevation, taken along the plane 8—8 of Figure 4.

As shown on the drawings:

In Figure 1, reference numeral 10 refers generally to a tractor or similar prime mover drivingly connected to an implement indicated at 11, which may take the form of a pickup-type hay baler such as that more fully described in the pending application Serial No. 310,281, of Vernon O. Hauswirth filed on even date herewith, and assigned to the assignee of the present invention.

The mounting frame of the present invention includes a primary or main frame element 12 of tubular construction having a rearward straight portion 13 connected at its free end, as by bolts 14, to the rear axle housing 15 of the tractor. The tubular beam 12 extends forwardly from the rear axle housing and is provided with a laterally inwardly directed forward portion 16 terminating in a lateral mounting plate 17 detachably secured, as by bolts 18, to a tractor attachment plate 19 provided adjacent the forward end of the tractor intermediate the tractor front wheels 20. The rear portion 13 of the beam 12 carries a pair of longitudinally spaced and aligned tubular pivot collars or sleeves 21 and 22 welded or otherwise rigidly secured thereto.

A secondary frame member 24 also takes the form of a tubular beam carrying at its forward extremity a transverse mounting pin 25 having a trailing extension 26 insertable within the longitudinal bore of the sleeve 21 of the beam 12. A second pivot or mounting pin 27, insertable in the sleeve 22, is carried by a laterally and rearwardly projecting arm 28 rigidly secured to the beam 24 and projecting therefrom toward the main frame 12. The free outer extremity of the laterally extending secondary frame beam 24 telescopically receives a tubular frame extension 24A which is secured to the beam 24 by bolts 24B. The frame extension 24A carries a ground engaging wheel 30 having a laterally extending axle 31 terminating in an upturned post 32 welded, or otherwise rigidly secured, to the tubular beam 24 through which the post 32 projects.

It will be appreciated that when the frame is in use, the weight of the implement is imposed upon the lateral beam 24 by virtue of the mounting of the implement thereon, as by the upstanding laterally spaced pedestals 33 (Figures 2 and 3) rigidly secured to the lateral beam and connected at their upper ends to the implement 11, as to the bale case 34 of the illustrated baler. The secondary frame is free to move vertically relative to the tractor 10 and the main frame 12 carried rigidly thereby by virtue of the pivoted movement of the pivot pins 26 and 27 within the associated pivot bores 21 and 22 respectively. The axle 31 of the ground-engaging wheel 30 is laterally aligned with the rear axle of the prime mover, so that steering of the tractor 10 results in steering of the implement without castering or sliding movement of the wheel 30. Actually, the weight of the implement is borne by the tractor 10 and the supplementary frame 24 with the load being distributed between the tractor wheels and the ground-engaging frame wheel 30.

The assembly of the implement upon the tractor is quite simple since the main frame 12 is bolted or otherwise rigidly attached to the rear axle housing 15 and the tractor mounted plate 19, following which the implement is positioned with the forward end of the beam 24 projecting between the tractor front and rear wheels with the pins 26 and 27 longitudinally aligned with the respective pivot sleeves 21 and 22. The tractor is driven forwardly until the pins 26 and 27 enter the sleeve bores to be secured therein by linch pins, cotter keys, or the like traversing the pins exteriorly of the sleeves.

In that form of the invention illustrated in Figures 4 through 8, the main frame and the secondary frame 24 are identical with those heretofore disclosed, with the exception that the ground-engaging wheel 30 and the frame extension 24a are removed from the secondary beam 24. Also, the main frame 12 is provided with a pair of laterally registering apertures 36 (Figure 7) through which projects a laterally extending mounting pin 37 welded or otherwise rigidly secured to the main frame 12 intermediate the pivot sleeves 21 and 22. The frames are assembled as hereinbefore described with the pivot pins 26 and 27 projecting through their respective pivot blocks 21 and 22.

The mounting pin 37 contacts the inner surface 38 of the closed bight 39 formed in a hanger strap 40 medially secured to a stabilizer bar 41 and retained on the pin by a linch pin 39a. The bar 41 is preferably formed of box-section stock and is rectangular in cross-section, as illustrated in Figure 8. As will best be seen in Figure 6, the central portion of the bar 41 is slightly depressed and the strap 40 is rigidly secured to this central portion of the bar 41. The bar bridges the gap between the implement and the tractor with the out-board end of the bar terminating in an upstanding plate 42 having an arcuate upper recess 43 (Figures 5 and 6) contacting the undersurface of the secondary frame beam 24. The inboard end of the bar 40 contacts the undersurface of the tractor frame casting and bears against a wear plate 44 contacting the inner terminal end of the bar and removably secured to the tractor, as by bolts 45 (Figure 4).

It will be appreciated that in the mounting arrangement illustrated in Figures 4 and 8, inclusive, the weight of the implement rests upon the outboard end of the stabilizer bar 40 and that this weight tends to cause rotation of the secondary frame about the pivot pins 26 and 27 relative to the main frame beam 12. Such rotation of the secondary frame is resisted by the contact of the inboard end of the stabilizer bar 40 with the undersurface of the tractor, so that the tendency of the secondary frame to rotate is resisted by the weight of the tractor. The strap and pin connection of the central portion of the bar with the main frame pin 12 provides the fulcrum about which such attempted secondary frame rotation occurs. The bar 40 thus serves as a bridging means fulcrumed at the main beam 12 with the counterbalanced weights of the implement and the tractor preventing relative beam pivoting movement. Thus, the entire weight of the implement is imposed upon the tractor and a fully-mounted tractor-implement combination is provided.

Thus, it will be appreciated that the present invention provides a new and novel implement mounting frame whereby the implement-tractor combination may be either fully or partially mounted, and the same main and secondary frame components may be utilized to provide either type of mounting. The normal relative pivotal movement of the tractor and implement beams is resisted by means carried by the implement beam, in one embodiment of the invention the resisting means is the ground wheel, and in the other embodiment the resisting means is the stabilizer bar. In either instance, the weight of the implement is imposed upon the resisting means so that at least a portion of the implement weight is borne by the tractor. The resulting increased utility of the frame and the adaption of the mounting to that type which best suits the use to which the implement is to be put will be readily understood.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In combination, a tractor, an implement, a main frame beam rigidly secured to said tractor to extend longitudinally thereof, a pair of spaced pivot sleeves on said main beam having longitudinal bores, a secondary frame beam rigidly secured to said implement, pivot pins carried by said secondary beam and positioned within said pivot sleeve bores to define a longitudinal pivot axis about which said frame beams are normally relatively pivotable, said secondary frame beam projecting generally laterally of said main frame beam to support said implement in laterally spaced relation to said tractor, and secondary beam-supporting means pivotally connected to said main frame and projecting laterally in either direction therefrom in load-bearing relationship with said tractor and said implement to resist normal pivotal movement of said main and secondary beams by virtue of the tractor weight and the implement weight imposed on said supporting means.

2. In combination, a tractor, an implement, a main frame beam rigidly connected to the tractor to extend longitudinally therealong, a pivot sleeve secured to a medial portion of said frame beam and having a longitudinal bore, a secondary frame beam rigidly connected to the implement, a pivot pin secured to said secondary frame for insertion into the bore of said pivot sleeve, said secondary frame beam projecting laterally of said main beam to dispose said implement in laterally spaced relation to said tractor, and a lateral weight transfer bar medially supported on said main frame beam and having one free end bearing the weight of said implement and the other free end underlying said tractor to counterbalance the weight of the implement against the weight of the tractor.

3. In combination, a tractor, an implement, a main frame beam rigidly secured to said tractor to extend longitudinally thereof, a pair of spaced pivot sleeves on said main beam having longitudinal bores, a secondary frame beam rigidly secured to said implement, pivot pins carried by said secondary beam and positioned within said pivot sleeve bores to define a longitudinal pivot axis about which said frame beams are normally relatively pivotable, said secondary frame beam projecting generally laterally of said main frame beam to support said implement in laterally spaced relation to said tractor, and a secondary beam-supporting stabilizer bar medially supported by said main beam and having opposing ends underlying said tractor and said secondary beam in load-bearing relationship therewith to resist normal relative movement of said main and secondary beams by virtue of the implement weight and the tractor weight imposed on opposite ends, respectively, of said stabilizer bar.

4. In combination, a tractor, an implement, a main frame beam rigidly secured to said tractor to extend longitudinally thereof, a pair of spaced pivot sleeves on said main beam having longitudinal bores, a secondary frame beam rigidly secured to said implement, pivot pins carried by said secondary beam and positioned within said pivot sleeve bores to define a longitudinal pivot axis about which said frame beams are normally relatively pivotable, said secondary frame beam projecting generally laterally of said main frame beam to support said implement in laterally spaced relation to said tractor, rigid bridging means projecting laterally from said secondary beam to underlie said tractor in load-bearing relationship therewith, and supporting means suspending a medial portion of said bridging means from said main frame and defining a fulcrum about which said bridging means is pivotable to resist normal relative movement of said main and secondary beams by virtue of the implement weight and the tractor weight imposed on opposite ends, respectively of said bridging means.

References Cited in the file of this patent

UNITED STATES PATENTS

| | | |
|---|---|---|
| 1,478,482 | Marriot et al. | Dec. 25, 1923 |
| 1,895,466 | Kuntz | Jan. 31, 1933 |